(12) United States Patent
Bagwell (10) Patent No.: US 12,038,507 B1
(45) Date of Patent: Jul. 16, 2024

(54) SYSTEMS AND METHODS FOR OPTICAL MEASUREMENT OF CROSS-WIND

(71) Applicant: National Technology & Engineering Solutions of Sandia, LLC, Albuquerque, NM (US)

(72) Inventor: Brett Bagwell, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1512 days.

(21) Appl. No.: 15/667,516

(22) Filed: Aug. 2, 2017

Related U.S. Application Data (60) Provisional application No. 62/503,723, filed on May 9, 2017.

(51) Int. Cl.
    *G01S 17/58*     (2006.01)

(52) U.S. Cl.
    CPC .................... *G01S 17/58* (2013.01)

(58) Field of Classification Search
    CPC ....................................................... G01S 17/58
    See application file for complete search history.

(56) References Cited

U.S. PATENT DOCUMENTS

| | | | |
|---|---|---|---|
| 4,028,673 A | 6/1977 | Taylor et al. | |
| 5,838,007 A * | 11/1998 | Wang | G01N 21/41 250/338.5 |
| 6,247,259 B1 | 6/2001 | Tsadka et al. | |
| 7,685,873 B2 | 3/2010 | Shapira | |
| 8,279,423 B2 | 10/2012 | Shapira | |
| 9,127,910 B2 | 9/2015 | Volfson | |
| 9,127,911 B2 | 9/2015 | Varshneya et al. | |
| 9,482,529 B2 * | 11/2016 | Becker | G01S 7/4813 |
| 2004/0021875 A1 * | 2/2004 | Northby | G01P 5/20 356/498 |
| 2005/0146706 A1 * | 7/2005 | Kameyama | G01S 17/32 356/28 |
| 2009/0051899 A1 * | 2/2009 | Harlander | G01J 3/453 356/51 |
| 2010/0128136 A1 * | 5/2010 | Belenkii | F41G 3/08 348/222.1 |
| 2011/0292371 A1 * | 12/2011 | Chang | G01S 17/10 356/5.01 |
| 2015/0052991 A1 | 2/2015 | Nootz et al. | |
| 2015/0146191 A1 * | 5/2015 | Kotake | G01S 7/487 356/28.5 |

(Continued)

*Primary Examiner* — Yuqing Xiao
*Assistant Examiner* — Zhengqing Qi
(74) *Attorney, Agent, or Firm* — Madelynne J. Farber; Samantha Updegraff; Merle W. Richman (57) ABSTRACT

Various technologies pertaining to optical measurement of cross-wind are described herein. A beam of light is emitted along a trajectory through a shooting space from a location of a shooter to a target using a laser. The beam is reflected by the target, and the beam is received at two optical detectors. Due to changes in the index of refraction of air along the path of the beam, an envelope signal atmospherically encoded on the beam is received at each of the two apertures at different times. A signal analyzer receives a signal from each of the detectors and outputs data indicative of an average speed of the cross-wind along the trajectory in the shooting space based upon a time delay between the signals.

20 Claims, 8 Drawing Sheets

(56) References Cited

U.S. PATENT DOCUMENTS

| | | | | |
|---|---|---|---|---|
| 2015/0293224 A1* | 10/2015 | Eldada | .................... | G01S 17/89 |
| | | | | 250/206.1 |
| 2015/0316368 A1* | 11/2015 | Moench | ............... | G01B 11/254 |
| | | | | 348/46 |
| 2017/0059712 A1* | 3/2017 | Yates | ..................... | G01S 17/18 |
| 2017/0082749 A1* | 3/2017 | Volfson | .................. | G01S 17/58 |
| 2017/0115393 A1* | 4/2017 | Nagai | .................. | G01S 7/4868 |
| 2017/0195589 A1* | 7/2017 | Kovacovsky | ........... | G01S 17/89 |
| 2017/0199272 A1* | 7/2017 | Takaoka | ................... | G01C 3/08 |
| 2018/0106900 A1* | 4/2018 | Droz | ....................... | G01S 17/08 |
| 2018/0341009 A1* | 11/2018 | Niclass | ................ | G01S 7/4815 |
| 2019/0242676 A1* | 8/2019 | Belenkii | ............... | F41G 3/165 |
| 2019/0285753 A1* | 9/2019 | Spruit | .................... | G01S 7/497 |
| 2020/0064485 A1* | 2/2020 | Kotake | .................. | G01S 17/87 |

\* cited by examiner

SYSTEMS AND METHODS FOR OPTICAL MEASUREMENT OF CROSS-WIND

RELATED APPLICATION

This application claims priority to U.S. Provisional Patent Application No. 62/503,723, filed on May 9, 2017, entitled "SYSTEMS AND METHODS FOR OPTICAL MEASUREMENT OF CROSS-WIND", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

In long-range shooting (e.g., greater than 700 meters distance between the weapon and the target), cross-wind can cause deflection of a bullet by inches or feet at the target location. Conventionally, snipers and other marksmen estimate the effects of cross-wind on bullet trajectory based upon point measurements of wind speed taken by anemometers as well as observed environmental factors (e.g., sway of vegetation, movement of loose objects caused by wind, etc.). Accurate shooting at long range based on estimates of the cross-wind from observations of environmental factors can typically be accomplished only by skilled and experienced marksmen. These methods of estimation generally are also unable to account for variations in the speed of cross-wind along the entire length of the trajectory of the bullet. Furthermore, at night it may be difficult to accurately observe environmental factors to infer cross-wind. Even with night-vision scopes and goggles, minor perturbations or variations in the environment that may be indicative of wind are difficult to observe.

Optical systems such as scintillometers are able to measure fluctuations in the index of refraction of air. Conventional scintillometers are not suitable for measurement of cross-wind in many shooting contexts, however, as scintillometers generally require a transmitter to be placed at one end of a measurement space and a receiver at the other. In military applications, for example, requiring a transmitter or receiver to be placed in proximity to a target is impractical.

SUMMARY

The following is a brief summary of subject matter that is described in greater detail herein. This summary is not intended to be limiting as to the scope of the claims.

Various technologies pertaining to optical measurement of cross-wind are described herein. Using a laser, a beam of light is emitted along a trajectory through a shooting space from a location of a shooter to a target. The beam is reflected by the target, and the beam is received at two apertures having respective fields of view (FOVs) that include the target. Due to changes in the index of refraction of air along the path of the beam, the beam is received at each of the two apertures at different times. Each of the apertures directs light to a respective optical detector that outputs a signal indicative of an intensity of the light received at the detector. A signal analyzer receives the signals output by the detectors, and the signal analyzer outputs data indicative of an average speed of the cross-wind along the trajectory in the shooting space.

In an exemplary embodiment, the beam of light emitted through the shooting space is a modulated beam signal (carrier signal) upon which an envelope signal is atmospherically encoded. When the reflection of the modulated beam of light is received at the optical detectors, the signals output by the two detectors comprise amplitude modulated (AM) signals. The signal analyzer demodulates these AM signals to extract the envelope signals. It then performs cross-correlation of the two resulting envelope signals to identify a delay between a first time at which an envelope signal was atmospherically encoded within the field of view of the first detector and a second time at which an envelope signal was atmospherically encoded within the field of view of the second detector. The signal analyzer outputs data indicative of an average speed of the cross-wind based upon the identified delay. By modulating the beam as a carrier wave, a signal-to-noise ratio of the atmospherically encoded envelope signals used to perform the cross-correlation is increased as compared to when a non-modulated beam is used. In some embodiments, the beam emitted by the laser is wider in a horizontal direction than in a vertical direction in order to increase the signal-to-noise ratio of signals used by the signal analyzer to identify the cross-wind speed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to estimation of a cross-wind speed along a trajectory from a shooting position to a target are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
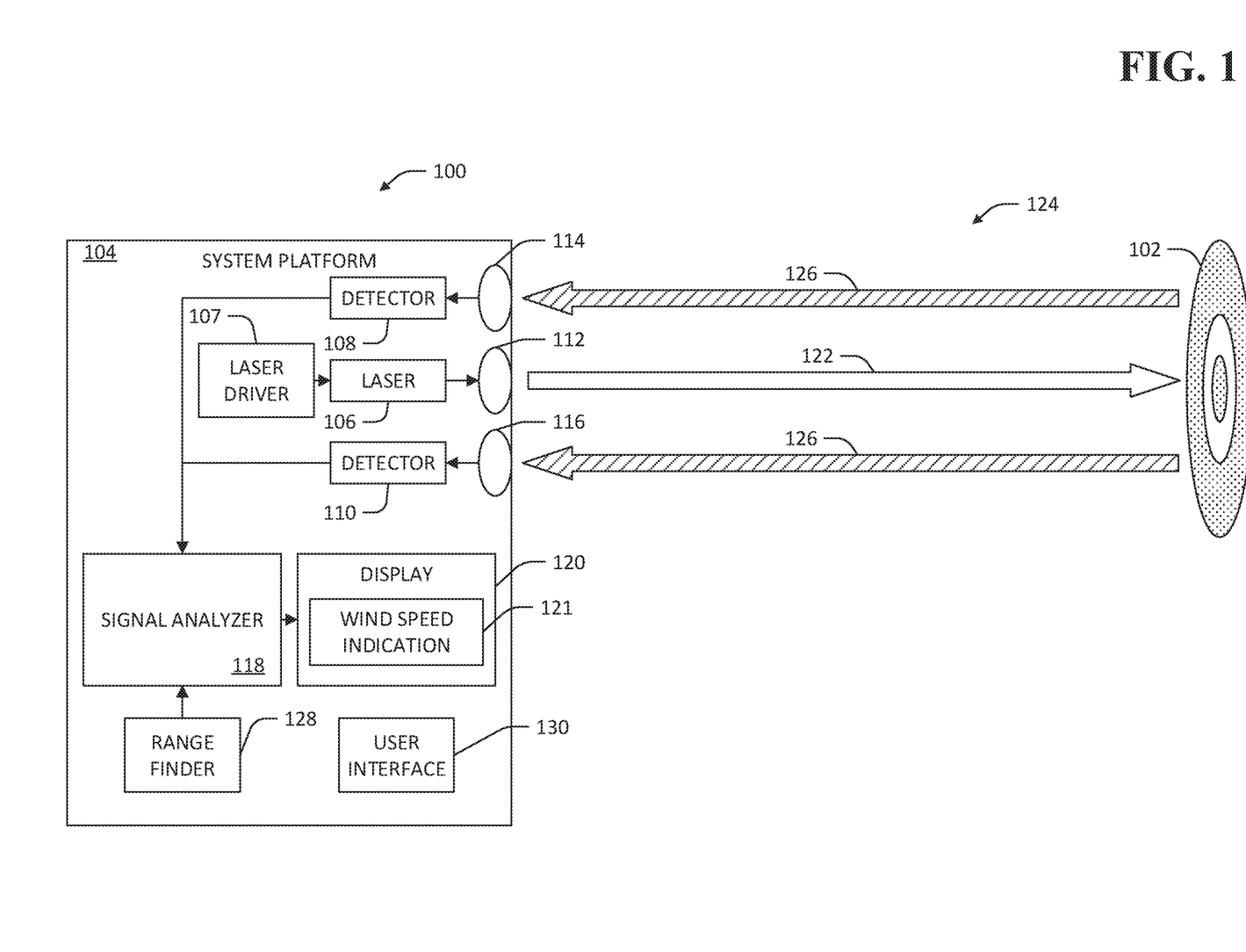
FIG. 1 is a functional block diagram of an exemplary optical system that facilitates estimation of cross-wind along a trajectory to a target.

With reference to FIG. 1, an exemplary system 100 that facilitates identification of a cross-wind speed along a trajectory toward a target 102 is illustrated. The system 100 includes a system platform 104 that serves as a platform on which additional components of the system 100 can be mounted. By way of an example, the system platform 104 can be a chassis configured for attaching to a weapon, such as a rifle. In another example, the system platform 104 can comprise a tripod-mounted chassis or handheld device. Included on the system platform 104 of the exemplary system 100 are a laser 106, controlled by a laser driver 107, a first optical detector 108, a second optical detector 110, and three apertures 112-116 corresponding to the laser 106 and the two detectors 108 and 110, respectively. Thus, the laser 106, the detectors 108, 110, and the apertures 112-116 are colocated.

The system 100 further comprises a signal analyzer 118, also mounted on the system platform 104, that receives signals output by the detectors 108, 110 and outputs data indicative of the cross-wind speed along the trajectory based upon the signals. The signal analyzer 118 can comprise one or more circuits made up of various electrical and other components configured to perform functions described herein with respect to the signal analyzer 118. For example, the signal analyzer 118 can be or comprise an application-specific integrated circuit (ASIC), field-programmable gate array (FPGA), a microprocessor supported by signal filtering, processing, and conditioning circuitry, etc. The system 100 can further comprise a display 120 mounted on the system platform 104, wherein the signal analyzer 118 outputs the data indicative of the cross-wind speed to the display 120, where it can be displayed as a wind speed indication 121.

The system 100 can be used by a marksman or other shooter to identify a cross-wind speed in a shooting space between the system platform 104, located at or near the shooter's position, and the target 102 in order to aid in first-shot accuracy. The system 100 can comprise a single device (e.g., as mounted on the system platform 104), such that a marksman need not have a receiver located at or near her target to identify cross-wind speed in the shooting space. It is to be understood that the system 100 may be suited to other applications for identifying a cross-wind speed.

Operations of the system 100 are now described. The laser 106 emits a beam of light 122 into a shooting space 124 toward the target 102. By way of example, the laser 106 can emit a beam having a wavelength of approximately 1550 nm with an average power output of approximately 500-700 mW. In other examples, the laser 106 can have different wavelengths and power output based upon application-specific considerations. For example, longer wavelengths or lower power output may be more eye-safe in applications where eye-safety is an important consideration. In still other examples, shorter wavelengths can be used to increase modulation of the beam 122 by the atmosphere, or a greater power can be used to increase power of a reflection 126 of the beam 122 received at the detectors 108, 110. The beam 122 is reflected by the target 102 and the reflection 126 of the beam 122 passes back through the shooting space 124. The reflection 126 is received at the apertures 114 and 116, which direct received light to respective detectors 108 and 110. As the beam 122 and the reflection 126 travel through the shooting space 124, changes in the index of refraction of the air in the shooting space 124 cause perturbations of the beam 122 and the reflection 126. These perturbations can include time-varying intensity fluctuations of the beam due to movement of the spot of the beam 122 at the target 102 relative to the FOVs of the detectors 108, 110, time-varying intensity of the spot of the beam 122 at the target, and angle of arrival fluctuations at the detectors 108, 110 due to a moving spot of the reflection across the detectors 108, 110 (e.g., due to movement of the detectors or detector masks in front of the apertures or between the apertures and the detectors). These perturbations cause modulation of an envelope signal on the intensity of the beam 122 and its reflection 126, wherein the envelope signal is received at the apertures 114, 116 at different times. The first detector 108 and the second detector 110 therefore receive modulated components of the reflection 126 at a first time and a second time, respectively. The system 100 is a double-pass system, in contrast with scintillometers, which are single-pass systems wherein a receiver is located apart from the transmitter and the receiver receives light from the transmitter directly. The system 100 can therefore be operated by a user operating a single system platform 104.

Each of the detectors 108, 110 is configured to output a signal indicative of an intensity of the light received at the detector for a wavelength or range of wavelengths of light. For example, each of the detectors can comprise a photodiode and supporting circuitry that outputs an analog electrical signal based upon the light incident on the photodiode. The signal analyzer 118 receives first and second signals from the respective first and second detectors 108, 110, and outputs data indicative of the cross-wind speed in the shooting space 124 based upon the first and second signals. The data output by the signal analyzer can be, for example, a value of the cross-wind speed, wherein the value can be displayed on the display 120 as the wind speed indication 121. The signal analyzer 118 is configured to generate the data indicative of the cross-wind speed by identifying a time lag between receipt of the envelope signal of the reflection 126 at the first detector 108 and receipt of the envelope signal of the reflection 126 at the second detector 110. The time lag can be identified by the signal analyzer 118 based upon the signals output by the detectors 108, 110. A delay between the first time and the second time can depend upon a distance from the laser 106 to the target 102. Therefore, the system 100 can further include a range finder 128 (e.g., a laser range finder mounted on the system platform 104), and the signal analyzer 118 can generate the data indicative of the cross-wind speed based upon the time lag and range data received from the range finder 128, wherein the range data is indicative of the distance from the laser 106 to the target 102.

In other exemplary embodiments, the signal analyzer 118 can be configured to generate the data indicative of the cross-wind speed based upon the signal from only one of the detectors 108, 110. For example, the signal analyzer 118 can receive the first signal from the first detector 108 and identify frequency content of the first signal. The signal analyzer 118 can execute a Fourier transform (e.g., a fast Fourier transform, or FFT) over the first signal to generate data indicative of the frequency content of the first signal. The speed of the cross-wind in the shooting space 124 is linearly proportional to a frequency of the atmospheric perturbations of the beam 122 and the reflection 126, which are also present in the first signal. Thus, the signal analyzer 118 can output the data indicative of the cross-wind speed based upon frequency components of the first signal that are the result of the atmospheric perturbations of the beam 122 and the reflection 126.

The system 100 can be configured to operate responsive to user input at a user interface 130. For example, the laser driver 107 can be configured to cause the laser 106 to output the beam responsive to receiving a signal from the user interface 130 indicating that a user has interacted with the interface 130. The user interface 130 can be or include a variety of different interfaces. By way of example, the user interface 130 can be a button or a trigger, and responsive to the user depressing the button or trigger, the laser 106 emits the beam 122. In other examples, the user interface 130 can comprise a switch, a touchscreen interface, or any other suitable means of facilitating user interaction.

Figure 2:
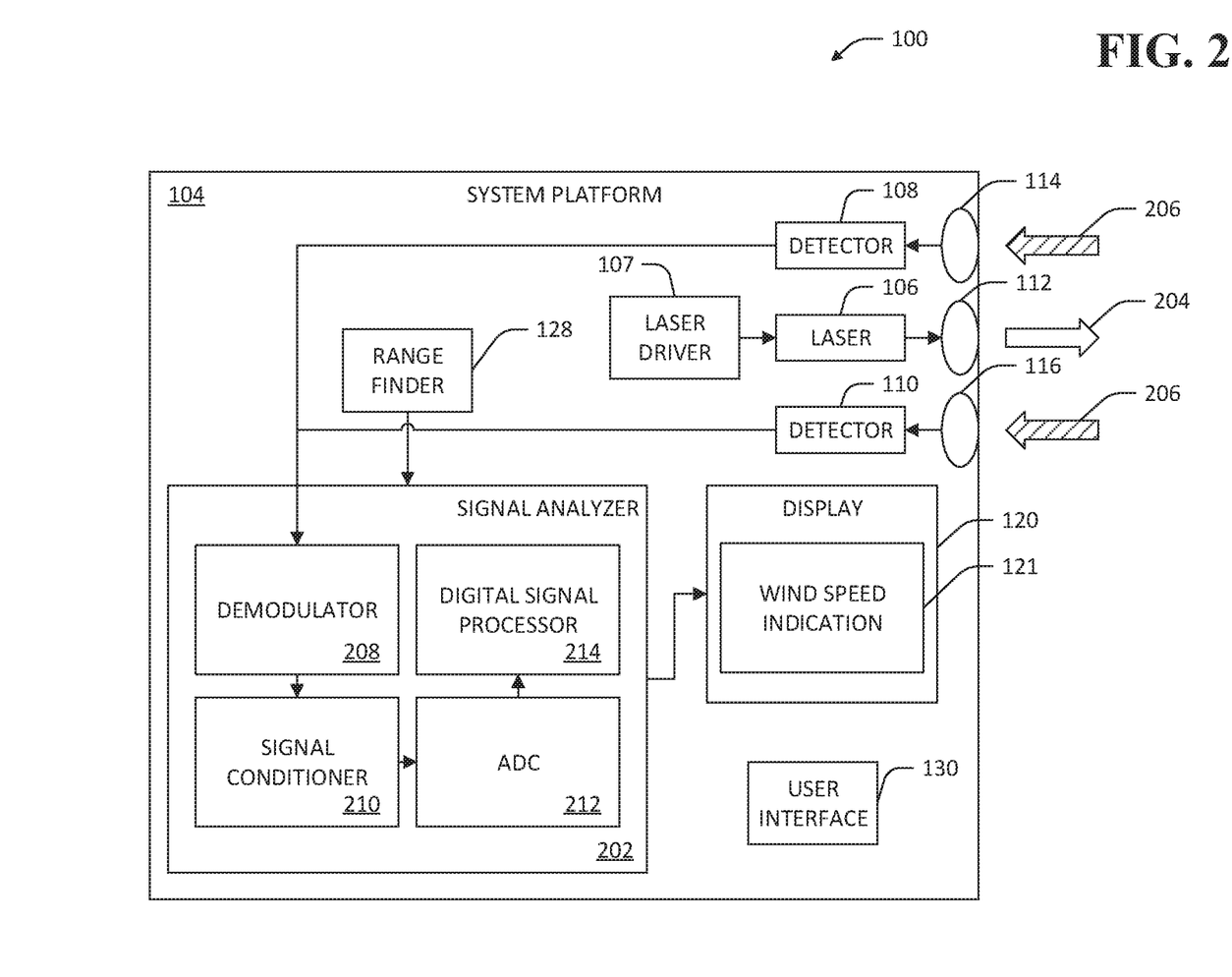
FIG. 2 is a functional block diagram of the exemplary optical system for estimation of cross-wind that illustrates detailed aspects of a signal analyzer.

Referring now to FIG. 2, an exemplary system 200 that facilitates identification of a cross-wind speed in a shooting space using a modulated laser signal is illustrated. By modulating the laser signal emitted into the shooting space, a signal to noise ratio of the system 200 can be increased as compared to a system using an unmodulated laser. The system 200 comprises the system platform 104, the laser 106, the laser driver 107, the detectors 108, 110, the apertures 112-116, and the display 120. The system 200 further comprises a signal analyzer 202 that is configured to output data indicative of the cross-wind speed based upon modulated signals received from the detectors 108, 110. In the exemplary system 200, the laser driver 107 is configured to cause the laser 106 to emit a modulated beam of light 204. In exemplary embodiments, the laser 106 emits a signal modulated at a carrier frequency of between 2 and 20 kHz, between 3 and 10 kHz, or between 4 and 8 kHz (e.g., 6 kHz). By way of further examples, atmospheric perturbations of the modulated beam 204 emitted by the laser 106 as it passes through the shooting space 124 can modulate an envelope signal onto the beam 204, wherein the envelope signal has a frequency of between 20 and 200 Hz, between 50 and 150 Hz, or between 75 and 125 Hz (e.g., 100 Hz). A reflection 206 of the modulated beam 204 from the target of the system 200 is received at the apertures 114, 116 and directed to the detectors 108, 110.

In the exemplary system 200, the detectors 108, 110 output first and second respective modulated analog signals indicative of the modulated beam reflection 206 directed to the detectors 108, 110 by the apertures 114, 116. For example, the detectors 108, 110 output first and second analog electrical signals indicative of an intensity of light received at the detectors 108 and 110, respectively. Thus, the first and second analog electrical signals include the envelope signal component modulated on the carrier signal component, in addition to signal components caused by ambient light and other optical noise at the detectors 108, 110.

The first and second analog signals output by the detectors 108, 110 are received by the signal analyzer 202 at a demodulator 208. The demodulator 208 demodulates the first and second analog signals to recover the envelope signal from each. The demodulator 208 is tuned to the modulation frequency of the laser 106. Hence, the demodulator 208 outputs demodulated signals that comprise components of the analog signals that are modulated at the modulation frequency of the laser 106. In general, the signal to noise ratio of the demodulated signals is higher than the signal to noise ratio of the signals output by the detectors 108, 110 in an unmodulated system, as noise caused by ambient light and other factors is generally not concentrated around the carrier frequency of the modulated beam 204. In an exemplary embodiment, the demodulator 208 comprises a lock-in amplifier circuit that demodulates the first and second modulated analog signals output by the detectors 108, 110, in order to recover the envelope signal. It is to be understood that other demodulating circuits may be used to demodulate the first and second modulated analog signals. In some embodiments, the demodulator 208 can comprise a narrow bandpass filter centered around the carrier frequency of the modulated beam 204.

The demodulator 208 outputs first and second demodulated analog signals corresponding to the first and second modulated analog signals, respectively. The demodulator 208 can optionally output the demodulated analog signals to a signal conditioner 210. The signal conditioner 210 comprises electrical circuits configured to reduce noise on the first and second demodulated analog signals in order to increase a signal-to-noise ratio of the signals. For example, the signal conditioner 210 can include filtering components and the like. The signal conditioner 210 can output conditioned signals to an analog-to-digital converter (ADC) 212, or the demodulator 208 can directly output the demodulated analog signals to the ADC 212. The ADC 212 samples the first and second demodulated analog signals and outputs first and second digital signals indicative of the values of the first and second demodulated analog signals, respectively, over a sampling period of time. The length of the sampling period can depend upon a variety of environmental factors including a level of ambient optical noise in the shooting space 124, temperature changes in the shooting space 124 (which can cause changes in the index of refraction of air in the shooting space 124), a signal to noise ratio of the demodulated analog signals, etc. The first and second digital signals are received at a digital signal processor 214, which performs cross-correlation of the first and second digital signals in order to identify the time delay between receipt of the envelope signal modulated on the reflection 206 at the first detector 108 and receipt of the envelope signal modulated on the reflection 206 at the second detector 110. The digital signal processor 214 can infer a speed of the cross-wind in the shooting space 124 based upon the time delay, wherein a greater delay is generally indicative of a greater cross-wind speed. The digital signal processor 214 can then output data indicative of the cross-wind speed to the display 120 where the data is displayed as the wind speed indication 121.

It is to be understood that while the exemplary system 200 illustrates the demodulator 208, the signal conditioner 210, and the ADC 212 as single components, these components can comprise multiple circuits operating in parallel. By way of example, the demodulator 208 can comprise a first demodulator circuit and a second demodulator circuit, wherein the first demodulator circuit demodulates the first signal received by the demodulator 208 from the first detector 108 and the second demodulator circuit demodulates the second signal received by the demodulator 208 from the second detector 110. Similarly, the signal conditioner 210 and the ADC 212 can each comprise first and second parallel components.

Figure 3:
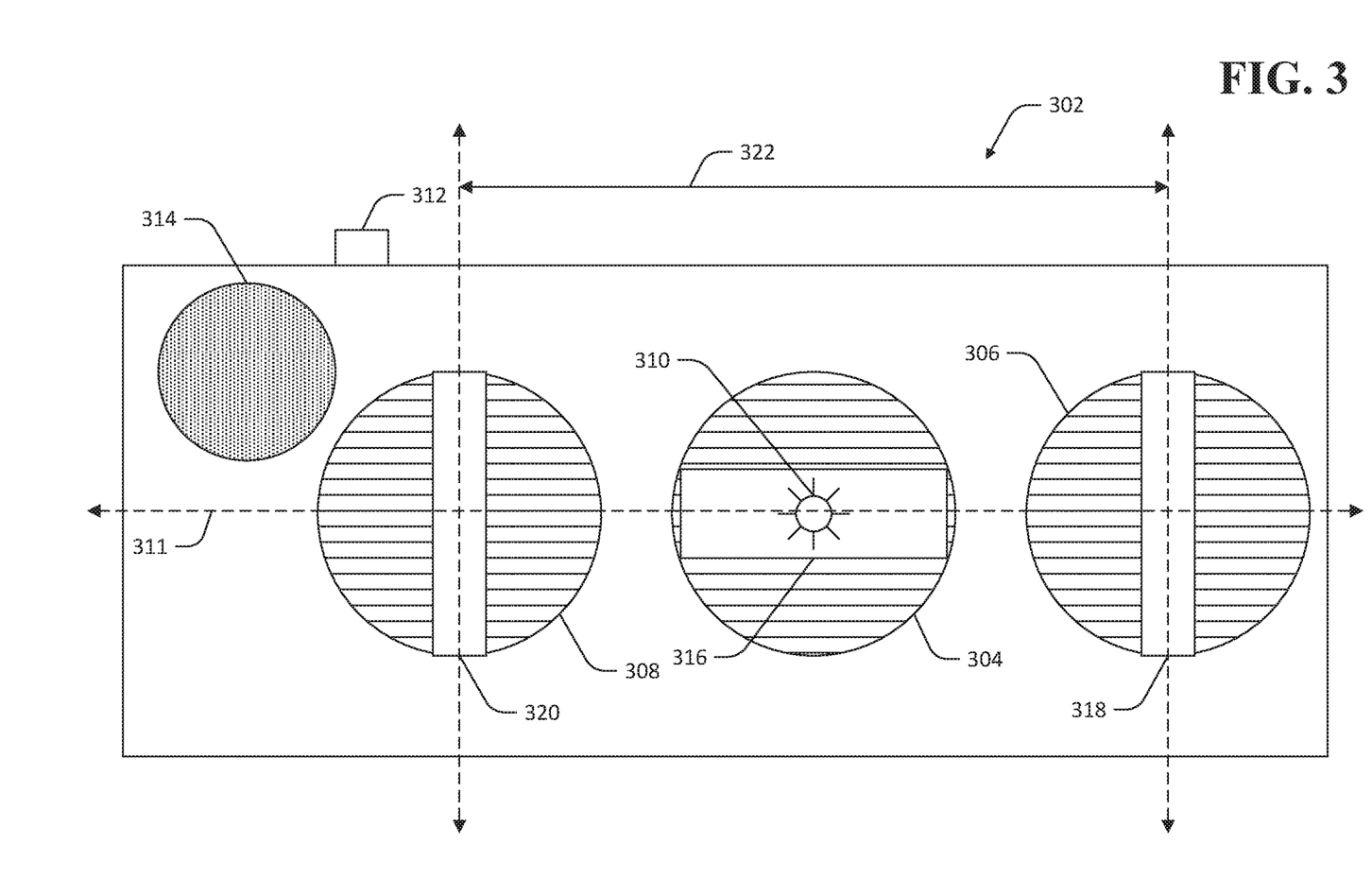
FIG. 3 is a front view of an exemplary system platform.

Referring now to FIG. 3, a front view of a system platform 302 of an exemplary optical system for estimation of cross-wind speed in a shooting space is illustrated. The system platform 302 includes three apertures 304-308, one each for a laser 310 and two detectors (not shown). In the exemplary system platform 302 shown, the apertures 304-308 are arranged along a horizontal line 311 extending left to right through the centers of the apertures 304-308. The aperture 304 corresponding to the laser 310 can be positioned in the center position of the three apertures 304-308. With respect to the front facing view of the platform 302, the aperture 306 corresponding to a first detector in the optical system can be positioned to the right of the aperture 304, and the aperture 308 corresponding to a second detector in the optical system can be positioned to the left of the aperture 304. While not shown in the front view of FIG. 3, the system platform 302 further includes a signal analyzer and a display, as in embodiments described above with respect to FIGS. 1 and 2. The system platform 302 further includes a user interface 312, depicted in FIG. 3 as a button, wherein responsive to interaction with the user interface 312 the laser 310 emits a beam of light at a target and the system for estimation of the cross-wind speed operates as described herein. The system platform 302 further comprises a viewfinder 314 by which a user can aim the laser 310 at the target. The viewfinder 314 can have a field of view (FOV) that is substantially similar to the FOVs of the apertures 306, 308. Thus, the user can sight the target in the viewfinder 314 in order to aim the laser 310 and the apertures 306, 308.

Figure 4:
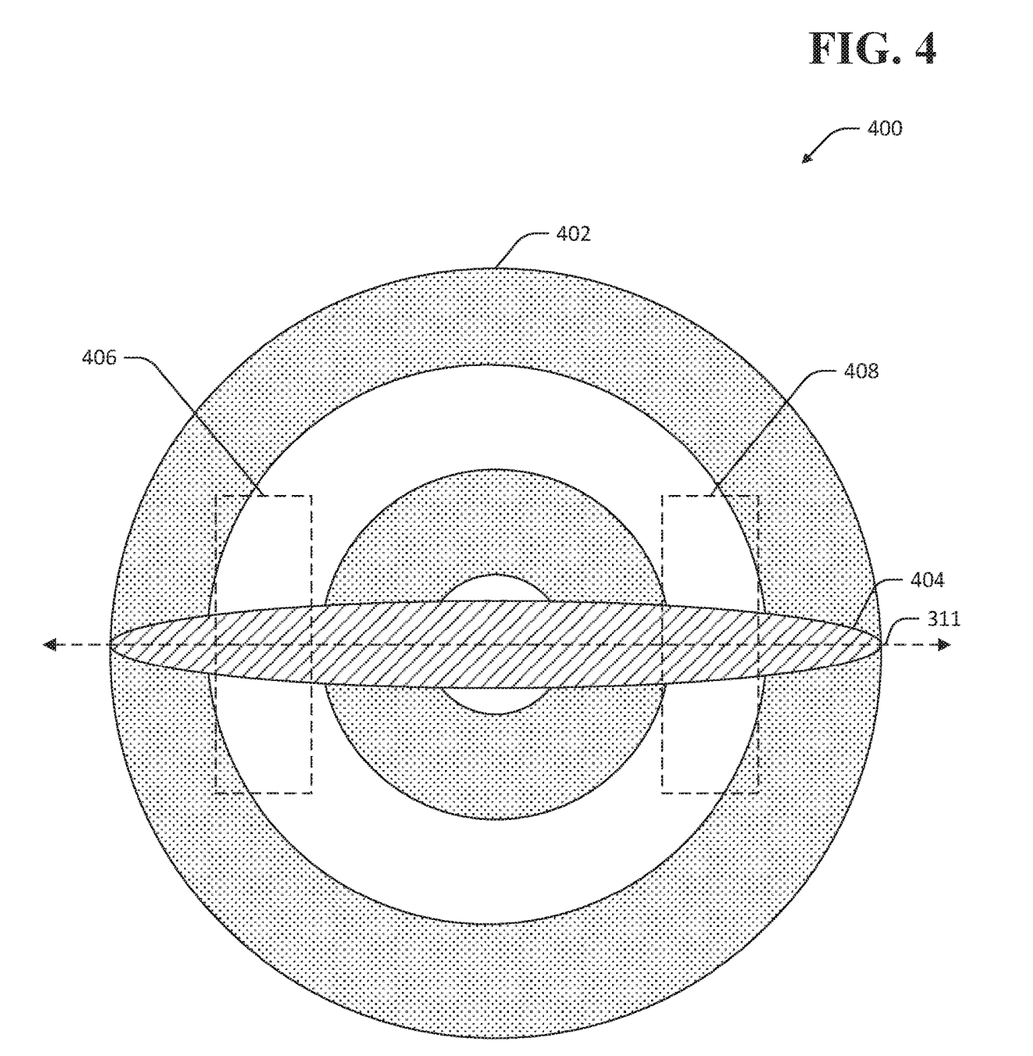
FIG. 4 is a facing view of a target illustrating a dispersal pattern of a laser at the target.

The apertures 304-308 further comprise slits 316-320, respectively, wherein the slits 316-320 control the horizontal and vertical FOVs of the apertures 304-308. In some embodiments, by restricting the FOVs of the apertures 304-308, a signal-to-noise ratio of signals output by the optical detectors of the system can be increased. By way of example, in various embodiments the beam emitted by the laser 310 is a non-symmetrical beam. Referring now to FIG. 4, a front-facing view 400 of a target 402 illuminated by the laser 310 is shown. The laser 310 emits a wide beam that illuminates the target 402 in a pattern 404 having a greater horizontal width than vertical height. It is to be understood that the laser 310 itself can be configured with optics that cause the beam to be emitted in the wide pattern 404, or the aperture 304 can comprise an astigmatic optical element that distorts the beam such that the beam has a greater horizontal width than vertical height. In exemplary embodiments, the horizontal width of the pattern 404 at the target 402 can be between 2 and 20 times greater than the vertical height of the pattern 404, between 5 and 15 times greater, or between 8 and 12 times greater. In one example, at a range of 800 meters between the laser 310 and the target 402, the pattern 404 has a width of approximately 24 inches and a height of approximately 2 inches. A first field of view 406 of the right aperture 306 and a second field of view 408 of the left aperture 308 are shown, wherein the fields of view 406, 408 have a greater vertical height than horizontal width due to the geometry of the slits 318, 320. In an example, at a range of 800 meters between the laser 310 and the target 402, the FOVs 406, 408 can have a vertical height of 36 inches and a horizontal width of 4 inches as measured at the target 402.

Figure 5:
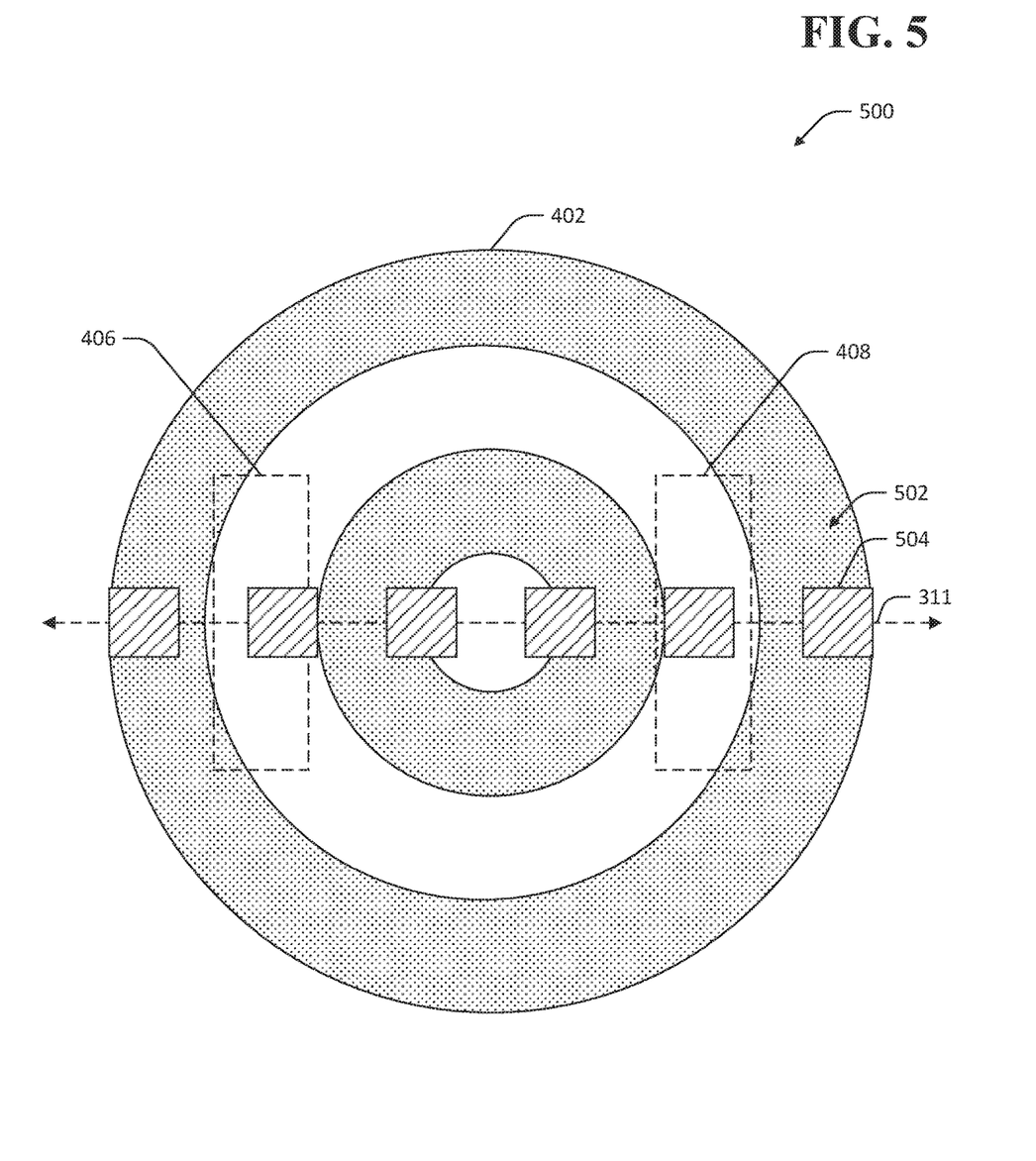
FIG. 5 is another facing of a target illustrating another dispersal pattern of a laser at the target.

In other exemplary embodiments, the laser 310 emits a beam in a structured illumination pattern wherein the intensity of the beam at the target is spatially-variant. For example, referring now to FIG. 5, a front-facing view 500 of the target 402 illuminated by the laser 310 is shown. In the view 500 of FIG. 5, the target is illuminated in a pattern 502 of multiple spots 504. The structured illumination pattern 502 can increase atmospheric modulation of the beam as it passes through the space between the target and the system platform, thereby enhancing a signal to noise ratio of signals output by the detectors. For example, as the target 402 moves relative to the pattern 502 or vice versa, time-variant fluctuations are introduced in the intensity of the beam, and these fluctuations are present in the output of the two detectors, with a time delay between them. The time delay is dependent upon the cross-wind speed, and thus the cross-wind speed can be inferred from the time delay.

Referring again to FIG. 3, the slits 318, 320 are movable with respect to one another along the horizontal line 311, such that a distance 322 between the slits 318, 320 can be increased or decreased. The signal analyzer 118, 202 can compute the cross-wind speed in the shooting space 124 based at least in part upon the distance between the slits 318, 320, or a distance between the apertures 306, 308 as defined by a distance between the centers of the apertures 306, 308 along the horizontal line 311. For a same cross-wind speed, a time delay between receipt of the reflection of the beam emitted by the laser at a first aperture and a second aperture depends upon a distance between the apertures in a direction normal to the direction of propagation of the laser.

Figure 6A:
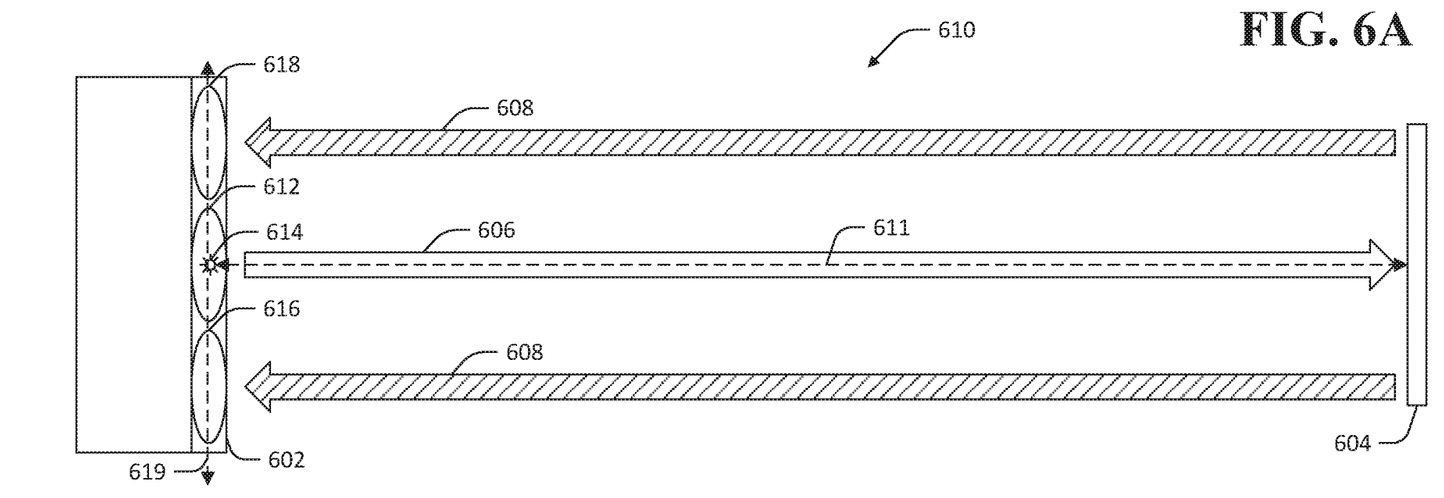
FIG. 6A is a top view of an optical system in an operational environment of the system, illustrating a path of propagation of a laser and its reflection.
Figure 6B:
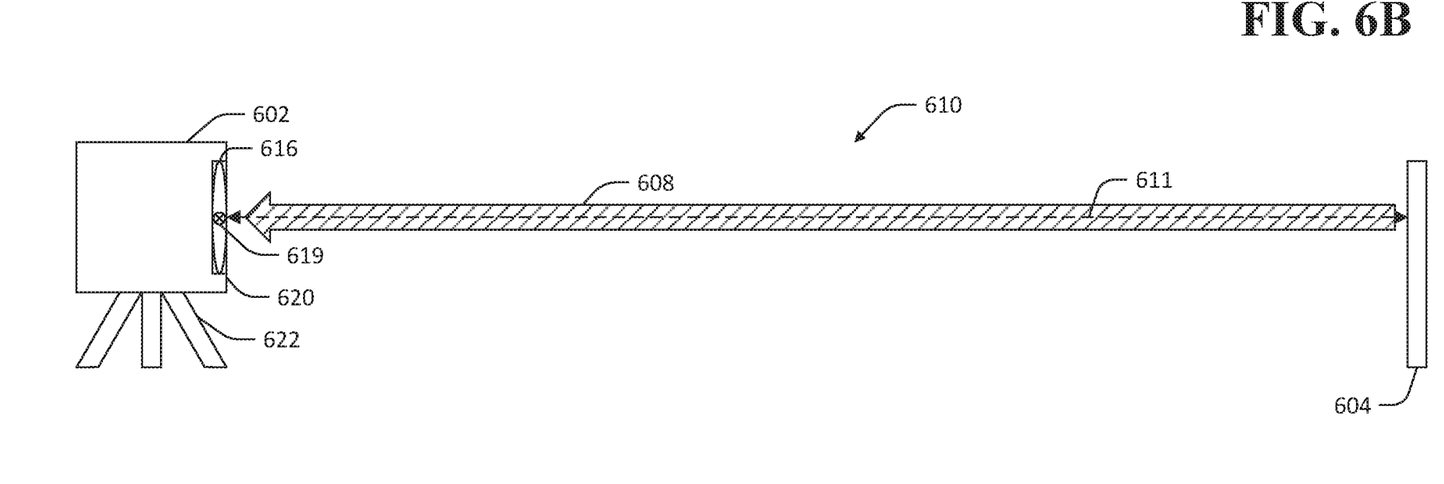
FIG. 6B is a side view of the optical system in the operational environment, illustrating paths of propagation of the reflection of the laser.

Referring now to FIGS. 6A and 6B, views of an exemplary system platform 602 and target 604 illustrating paths of a laser beam 606 and its reflection 608 through a shooting space 610 along a direction of propagation 611 of the laser 606 are shown. Referring to FIG. 6A, a top view of the system platform 602 and the target 604 is shown. The system platform 602 includes a center aperture 612 corresponding to a laser 614 that emits the beam 606. The system platform 602 further comprises a left aperture 616 corresponding to a first optical detector (not shown) and a right aperture 618 corresponding to a second optical detector (not shown), wherein left and right are defined from a perspective facing a front of the system platform 602, the front of the platform 602 being at the right-most side of the platform 602 in the top view of FIG. 6A. The left aperture 616 and the right aperture 618 are offset from one another in a direction 619 that is normal to the direction of propagation 611 of the laser 606. Referring now to FIG. 6B, a side view of the system platform 602 and the target 604 is shown. In the side view, the left aperture 616 and the reflection 608 that it receives are nearest the viewer, while the center aperture 612 is further away, and the right aperture 614 is further still. The exemplary system platform 602 comprises a chassis portion 620 mounted on a tripod 622. The direction 619 that is normal to the direction of propagation 611 of the laser 606 is shown, wherein the direction 619 extends into and out of the paper.

Figure 7:
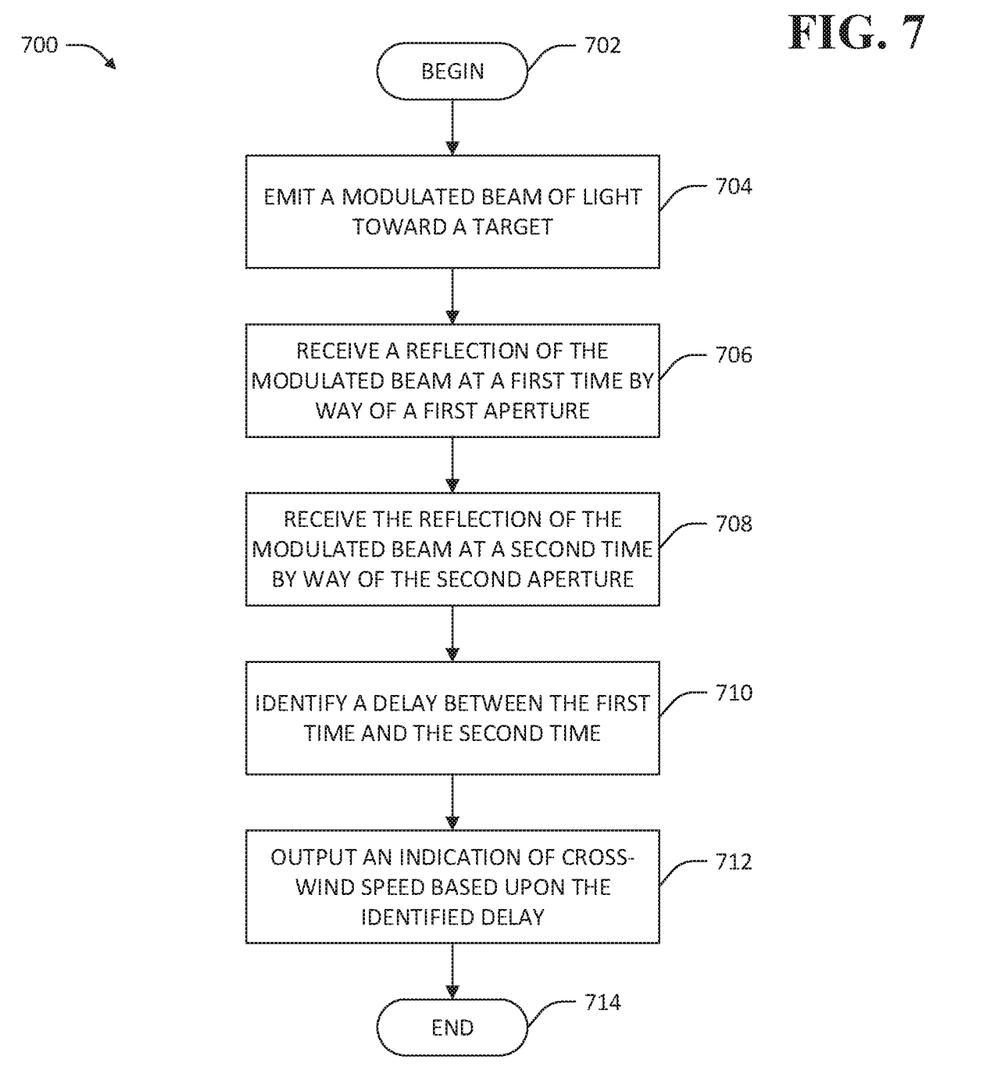
FIG. 7 is a flow diagram that illustrates an exemplary methodology for identifying a cross-wind speed in a shooting space between a laser and a target based upon optical measurements.

FIG. 7 illustrates an exemplary methodology relating to identifying a cross-wind speed in a shooting space based upon optical measurements. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 that facilitates identifying a cross-wind speed in a shooting space based upon optical measurements in the shooting space is illustrated. The methodology 700 begins at 702, and at 704 a modulated beam of light is emitted toward a target in the shooting space. The modulated beam of light comprises a carrier component and an envelope signal modulated on the carrier component. In exemplary embodiments, the modulated beam of light is emitted from an aperture in a pattern having a greater horizontal width than vertical height. When the modulated beam strikes the target it is reflected back toward the source of the light, and at 706 a reflection of the modulated beam is received at a first time by way of a first aperture. Due to changes in the index of refraction of air in the shooting space, the beam is perturbed such that the reflection of the modulated beam is received at a second time by way of a second aperture at 708, wherein the second aperture is offset from the first aperture. In exemplary embodiments, the light received by way of the first aperture and the second aperture is directed to respective first and second optical detectors. Each of the optical detectors is configured to output an electrical signal indicative of an intensity of light received by the detector. Thus, the first and second optical detectors output first and second respective electrical signals indicative of the light received at the first and second detectors, wherein the first and second electrical signals comprise the carrier component and the envelope signal. At 710 a delay between the first time and the second time is identified. The delay can be identified by demodulating the first and second electrical signals to recover the envelope signal and cross-correlating the demodulated first and second electrical signals to identify the delay. In embodiments, the first and second electrical signals are analog signals. An ADC can be used to digitally sample the first and second electrical signals, and the cross-correlation can be performed using the digitally sampled signals. At 712, an indication of the cross-wind speed in the shooting space is output based upon the identified delay, whereupon the methodology 700 ends 714. The indication of the cross-wind speed can be or include a value of the cross-wind speed, which can be output to a user on a display.

Figure 8:
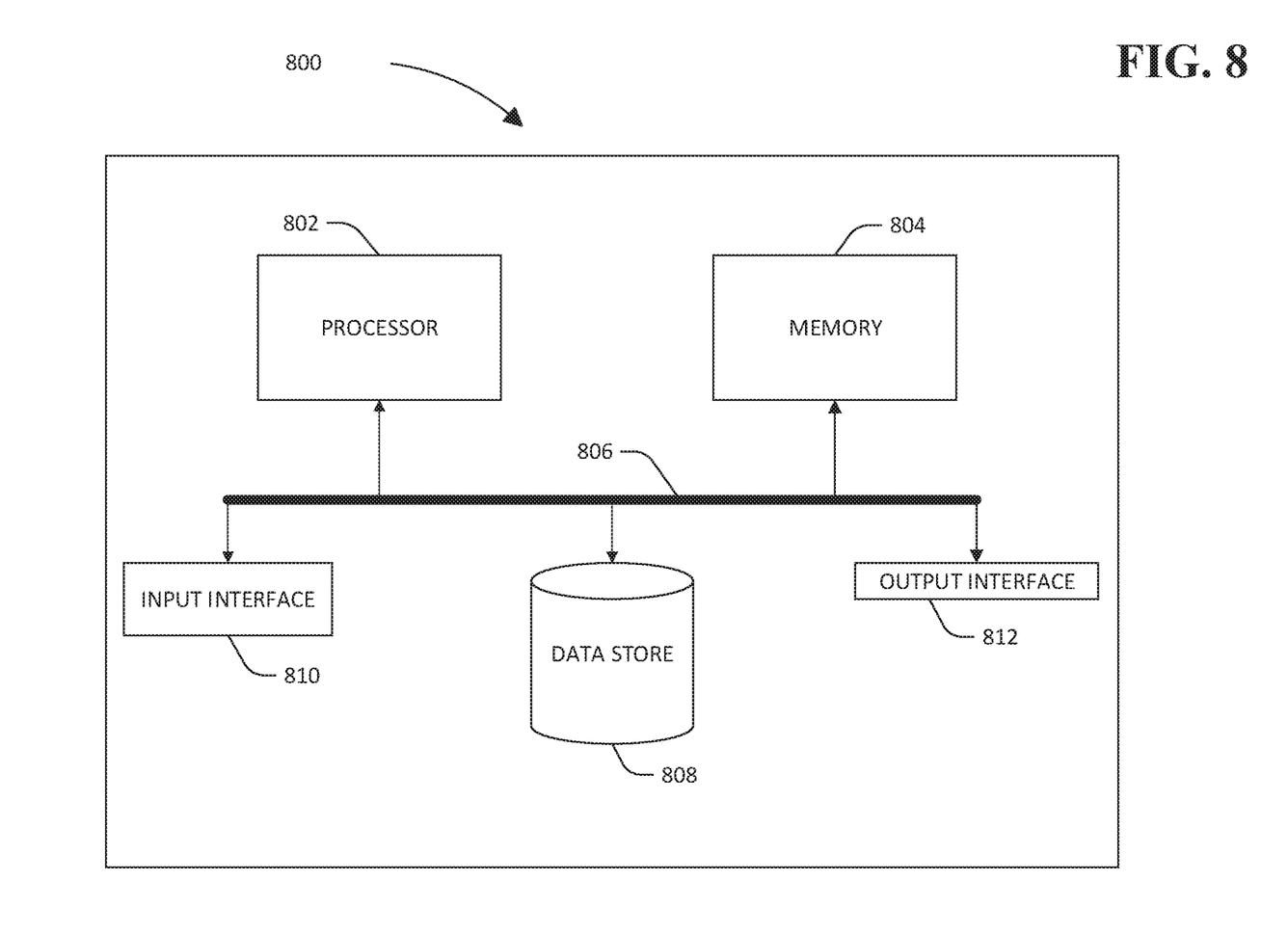
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in connection with performing functions described herein with respect to the signal analyzers 118, 202. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store detector signal data, range data, modulation settings, etc.

The computing device 800 additionally includes a data store 808 that is accessible by the processor 802 by way of the system bus 806. The data store 808 may include executable instructions, signal data, user configuration settings, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a platform comprising:
      a laser that emits a modulated beam of light toward a target based upon a modulation frequency of the laser, wherein the modulated beam of light is emitted in a pattern having a greater horizontal width than vertical height, and further wherein an envelope signal is atmospherically encoded upon the modulated beam of light as the modulated beam of light travels between the laser and the target;
      a range finder that outputs a distance between the platform and the target;
      an optical system comprising:
         a first aperture;
         a second aperture; and
         a third aperture, where the modulated beam of light is emitted toward the target through the third aperture;
         a first optical detector that has a first field of view, where the first optical detector receives first light through the first aperture, the first light includes a reflection of the modulated beam of light from the target, and further where the first light includes the envelope signal received by the first optical detector at a first time, where the first optical detector outputs a first analog signal that is indicative of the first light;
         a second optical detector that has a second field of view, where the second optical detector receives second light through the second aperture, the second light includes the reflection of the modulated beam of light from the target, where the second light includes the envelope signal received by the second optical detector at a second time, and further where the second optical detector outputs a second analog signal that is indicative of the second light; and
         a signal analyzer that:
            demodulates the first analog signal and the second analog signal to recover the envelope signal in each of the first analog signal and the second analog signal; and
            identifies a lag between when the envelope signal was received by the first detector and when the envelope signal was received by the second detector wherein a combination of the lag and the distance output by the range finder is indicative of cross-wind speed between the system and the target.

2. The system of claim 1, wherein the first aperture comprises a first slit that controls the first field of view, the first slit has a greater height than width, and the second aperture comprises a second slit that controls the second field of view, the second slit has a greater height than width.

3. The system of claim 2, the first slit and the second slit are movable with respect to one another.

4. The system of claim 2, wherein the signal analyzer comprises a demodulator that is tuned to the modulation frequency of the laser, where the demodulator demodulates the first analog signal and the second analog signal.

5. The system of claim 4, the modulated beam comprising a carrier component having a frequency of between 2 and 20 kHz.

6. The system of claim 4, where the signal analyzer identifies the lag by performing cross-correlation of the first demodulated signal and the second demodulated signal.

7. The system of claim 2, the first aperture positioned to the left of the laser relative to a direction of propagation of the beam of light, the second aperture positioned to the right of the laser relative to the direction of propagation.

8. The system of claim 1, wherein the signal analyzer receives a distance between the first aperture and the second aperture.

9. A system, comprising:
   a platform comprising:
      a laser that emits a modulated beam of light toward a target based upon a modulation frequency of the laser, wherein the modulated beam of light is emitted in a pattern having a greater horizontal width than vertical height, and further wherein an envelope signal is atmospherically encoded upon the modulated beam of light as the modulated beam of light travels between the laser and the target;
      a range finder that outputs a distance between the platform and the target;
      an optical system comprising:
         a first aperture;
         a second aperture; and
         a third aperture, where the modulated beam of light is emitted toward the target through the third aperture;
         a first optical detector that has a first field of view, where the first optical detector receives first light through the first aperture, the first light includes a reflection of the modulated beam of light from the target, and further where the first light includes the envelope signal received by the first optical detector at a first time, where the first optical detector outputs a first analog signal that is representative of the first light;
         a second optical detector that has a second field of view, where the second optical detector receives second light through the second aperture, the second light includes the reflection of the modulated beam of light from the target, where the second light includes the envelope signal received by the second optical detector at a second time, and further where the first optical detector outputs a second analog signal that is representative of the second light; and
         a signal analyzer that:
            demodulates the first analog signal to create a first demodulated signal;
            recovers the envelope signal from the first demodulated signal;
            demodulates the second analog signal to create a second demodulated signal;

recovers the envelope signal from the second demodulated signal; and identifies a lag between when the envelope signal was received by the first detector and when the envelope signal was received by the second detector based upon the envelope signals recovered from the first demodulated signal and the second demodulated signal.

10. The system of claim 9, wherein the first aperture comprises a first slit that controls the first field of view, the first slit has a greater height than width the second aperture comprises a second slit that controls the second field of view, the second slit has a greater height than width.

11. The system of claim 10, the first slit and the second slit are movable with respect to one another.

12. The system of claim 10, wherein the signal analyzer comprises a demodulator that is tuned to the modulation frequency of the laser, and further where the demodulator demodulates the first analog signal and the second analog signal.

13. The system of claim 10, the modulated beam of light comprising a carrier component having a frequency of between 2 and 20 kHz.

14. The system of claim 10, where the signal analyzer identifies the lag by performing cross-correlation of the first demodulated signal and the second demodulated signal.

15. The system of claim 10, the first aperture positioned to the left of the laser relative to a direction of propagation of the beam of light, the second aperture positioned to the right of the laser relative to the direction of propagation.

16. The system of claim 9, wherein the signal analyzer receives a distance between the first aperture and the second aperture.

17. A method comprising:
emitting a modulated beam of light from a laser toward a target, where the laser emits the modulated beam of light based upon a modulation frequency assigned to the laser, wherein the modulated beam of light is emitted in a pattern having a greater horizontal width than vertical height, and further wherein an envelope signal is atmospherically encoded upon the modulated beam of light as the modulated beam of light travels between the laser and a target, and further where the laser is included in a platform with a first optical detector and a second optical detector;

determining a distance between the platform and the target;

receiving, by the first optical detector that has a first field of view through a first aperture, first light through the first aperture, the first light includes a reflection of the beam of light from the target, and further where the first light includes the envelope signal received by the first optical detector at a first time;

outputting, by the first optical detector, a first analog signal that is representative of the first light;

receiving, by the second optical detector that has a second field of view through a second aperture, second light through the second aperture, the second light includes the reflection of the beam of light from the target, and further where the second light includes the envelope signal received by the second optical detector at a second time;

outputting, by the second optical detector, a second analog signal that is representative of the second light;

demodulating the first analog signal to form a first demodulated signal;

recovering a first instance of the envelope signal from the first demodulated signal;

demodulating the second analog signal to form a second demodulated signal;

recovering a second instance of the envelope signal from the second demodulated signal; and identifying a lag between when the envelope signal was received by the first detector and when the envelope signal was received by the second detector based upon the recovered first instance of the envelope signal and the recovered second instance of the envelope signal, where a combination of the lag and the distance between the platform and the target is indicative of cross-wind speed between the detection system and the target.

18. The method of claim 17, wherein the first aperture comprises a first slit that controls the first field of view, the first slit has a greater height than width the second aperture comprises a second slit that controls the second field of view, the second slit has a greater height than width.

19. The method of claim 18, the first slit and the second slit are movable with respect to one another.

20. The method of claim 17, where a demodulator that demodulates the first analog signal and the second analog signal is tuned to the modulation frequency of the laser.

* * * * *